United States Patent
Schwarz, Jr.

(10) Patent No.: US 7,051,925 B2
(45) Date of Patent: *May 30, 2006

(54) SYSTEM AND METHOD FOR FUNDING A COLLECTIVE ACCOUNT BY USE OF AN ELECTRONIC TAG

(75) Inventor: Charles E. Schwarz, Jr., Wilmington, DE (US)

(73) Assignee: BankOne Delaware, N.A., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/937,655

(22) Filed: Sep. 9, 2004

(65) Prior Publication Data
US 2005/0040221 A1     Feb. 24, 2005

Related U.S. Application Data

(63) Continuation of application No. 09/927,462, filed on Aug. 13, 2001, now Pat. No. 6,945,453.

(51) Int. Cl.
*G06F 17/00* (2006.01)

(52) U.S. Cl. ............... 235/375; 235/383; 235/380; 705/1; 705/14

(58) Field of Classification Search ............... 235/375, 235/380, 382, 383, 384, 487, 492; 705/1, 705/13, 14, 17; 340/870.17
See application file for complete search history.

(56) References Cited

U.S. PATENT DOCUMENTS

| | | |
|---|---|---|
| 3,634,669 A | 1/1971 | Spontak |
| 3,946,206 A | 3/1976 | Darjany |
| 4,047,033 A | 9/1977 | Maimberg |
| 4,465,206 A | 8/1984 | Sorel et al. |
| 4,545,838 A | 10/1985 | Minkus |
| 4,582,985 A | 4/1986 | Lofberg |
| 4,614,861 A | 9/1986 | Pavlov et al. |
| 4,634,845 A | 1/1987 | Hale et al. |
| 4,689,478 A | 8/1987 | Hale et al. |
| 4,700,055 A | 10/1987 | Kashkashian, Jr. |
| 4,746,787 A | 5/1988 | Suto et al. |
| 4,750,119 A | 6/1988 | Cohen et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |

(Continued)

FOREIGN PATENT DOCUMENTS

CA        2293321        12/1998

(Continued)

OTHER PUBLICATIONS

Credit Card News, "A store card issuer looks for lift from electronic gift certificates," Feb. 1, 1995, 2 pages.

(Continued)

*Primary Examiner*—Steven S. Paik
(74) *Attorney, Agent, or Firm*—Hunton & Williams LLP

(57) ABSTRACT

A system and method for funding a collective account via aggregating usage of electronic tags is disclosed. The system and method promotes the use of electronic tags, and the funding of collective accounts that may be associated with charitable or other philanthropic causes. Further benefits may be realized by replenishing the prefunded account that serves as the source of funds for the electronic tag to an affinity account that also benefits the charitable or other philanthropic cause.

81 Claims, 4 Drawing Sheets

U.S. PATENT DOCUMENTS

| | | |
|---|---|---|
| 4,831,242 A | 5/1989 | Englehardt |
| 4,831,526 A | 5/1989 | Luchs |
| 4,868,376 A | 9/1989 | Lessin et al. |
| 4,870,259 A | 9/1989 | Boggan et al. |
| 4,882,675 A | 11/1989 | Nichtberger |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliot et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton |
| 5,049,728 A | 9/1991 | Rovin |
| 5,055,662 A | 10/1991 | Hasewaga |
| 5,056,019 A | 10/1991 | Schultz et al. |
| 5,080,748 A | 1/1992 | Bonomi |
| 5,095,194 A | 3/1992 | Barbanell |
| 5,117,355 A | 5/1992 | McCarthy |
| 5,175,416 A | 12/1992 | Mansvelt et al. |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,803 A | 4/1993 | Vitagliano |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe |
| 5,349,633 A | 9/1994 | Katz |
| 5,350,906 A | 9/1994 | Brody |
| 5,359,183 A | 10/1994 | Skodlar |
| 5,365,575 A | 11/1994 | Mannik |
| 5,383,113 A | 1/1995 | Kight et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert |
| 5,450,477 A | 9/1995 | Amarant |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt |
| 5,466,919 A * | 11/1995 | Hovakimian ................ 705/17 |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark |
| 5,483,445 A | 1/1996 | Pickering |
| 5,500,514 A | 3/1996 | Veeneman |
| 5,511,114 A | 4/1996 | Stimson |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik |
| 5,537,314 A | 7/1996 | Kanter |
| 5,544,086 A | 8/1996 | Davis |
| 5,544,246 A | 8/1996 | Mandelbaum |
| 5,553,120 A | 9/1996 | Katz |
| 5,577,109 A | 11/1996 | Stimson |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,640 A | 4/1997 | Burke |
| 5,621,787 A | 4/1997 | Reginald |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Bloomberg et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle |
| 5,653,914 A | 8/1997 | Holmes et al. |
| 5,664,110 A | 9/1997 | Green |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio |
| 5,675,662 A | 10/1997 | Deaton et al. |
| 5,677,955 A | 10/1997 | Doggett |
| 5,684,291 A | 11/1997 | Taskett |
| 5,687,322 A | 11/1997 | Deaton et al. |
| 5,689,100 A | 11/1997 | Carrithers |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder |
| 5,710,458 A | 1/1998 | Iwasaki |
| 5,710,886 A | 1/1998 | Christensen |
| 5,710,887 A | 1/1998 | Chelliah |
| 5,710,889 A | 1/1998 | Clark et al. |
| 5,715,399 A | 2/1998 | Bezos |
| 5,721,768 A | 2/1998 | Stimson |
| 5,721,781 A | 2/1998 | Deo et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A * | 4/1998 | Akiyama et al. ...... 340/870.17 |
| 5,745,706 A | 4/1998 | Wolfberg et al. |
| 5,749,075 A | 5/1998 | Toader et al. |
| 5,760,381 A | 6/1998 | Stich |
| 5,765,141 A | 6/1998 | Spector |
| 5,770,843 A | 6/1998 | Rose |
| 5,770,849 A | 6/1998 | Novis et al. |
| 5,774,870 A | 6/1998 | Storey |
| 5,777,305 A | 7/1998 | Smith |
| 5,777,306 A | 7/1998 | Masuda |
| 5,777,903 A | 7/1998 | Piosenka et al. |
| 5,778,067 A | 7/1998 | Jones et al. |

| | | | | | |
|---|---|---|---|---|---|
| 5,787,156 A | 7/1998 | Katz | 6,000,832 A | 12/1999 | Franklin et al. |
| 5,787,404 A | 7/1998 | Fernandez-Holman | 6,002,383 A | 12/1999 | Shimada |
| 5,789,733 A | 8/1998 | Jachimowicz et al. | 6,003,762 A | 12/1999 | Hayashida |
| 5,794,207 A | 8/1998 | Walker et al. | 6,004,681 A | 12/1999 | Epstein et al. |
| 5,799,087 A | 8/1998 | Rosen | 6,006,988 A | 12/1999 | Behrmann et al. |
| 5,802,176 A | 9/1998 | Audebert | 6,009,415 A | 12/1999 | Shurling et al. |
| 5,805,719 A | 9/1998 | Pare et al. | 6,014,636 A | 1/2000 | Reeder |
| 5,806,042 A | 9/1998 | Kelly et al. | 6,014,638 A | 1/2000 | Burge et al. |
| 5,806,044 A | 9/1998 | Powell | 6,014,645 A | 1/2000 | Cunningham |
| 5,806,045 A | 9/1998 | Biorge | 6,014,749 A | 1/2000 | Gloor et al. |
| 5,807,627 A | 9/1998 | Friend et al. | 6,016,482 A | 1/2000 | Molinari et al. |
| 5,809,478 A | 9/1998 | Greco | 6,016,954 A | 1/2000 | Abe |
| 5,815,657 A | 9/1998 | Williams et al. | 6,018,718 A | 1/2000 | Walker et al. |
| 5,815,658 A | 9/1998 | Kuriyama | 6,019,284 A | 2/2000 | Freeman et al. |
| 5,819,234 A | 10/1998 | Slavin et al. | 6,026,370 A | 2/2000 | Jermyn |
| 5,819,237 A | 10/1998 | Garman | 6,029,139 A | 2/2000 | Cunningham et al. |
| 5,832,457 A | 11/1998 | O'Brien | 6,029,890 A | 2/2000 | Austin |
| 5,835,061 A | 11/1998 | Stewart | 6,032,136 A | 2/2000 | Brake, Jr. et al. |
| 5,835,576 A | 11/1998 | Katz | 6,036,099 A | 3/2000 | Leighton |
| 5,839,113 A | 11/1998 | Federau et al. | 6,038,292 A | 3/2000 | Thomas |
| 5,845,259 A | 12/1998 | West | 6,038,552 A | 3/2000 | Fleischl |
| 5,845,260 A | 12/1998 | Nakano et al. | 6,041,315 A | 3/2000 | Pollin |
| 5,852,811 A | 12/1998 | Atkins | 6,045,042 A | 4/2000 | Ohno |
| 5,852,812 A | 12/1998 | Reeder | 6,047,067 A | 4/2000 | Rosen |
| 5,857,079 A | 1/1999 | Claus | 6,049,463 A | 4/2000 | O'Malley et al. |
| 5,857,175 A | 1/1999 | Day | 6,049,773 A | 4/2000 | McCormack et al. |
| 5,857,709 A | 1/1999 | Chock | 6,049,782 A | 4/2000 | Gottesman et al. |
| 5,859,419 A | 1/1999 | Wynn | 6,058,378 A | 5/2000 | Clark et al. |
| 5,864,609 A | 1/1999 | Cross | 6,061,660 A | 5/2000 | Eggleston et al. |
| 5,864,828 A | 1/1999 | Atkins | 6,064,985 A | 5/2000 | Anderson |
| 5,864,830 A | 1/1999 | Armetta | 6,065,675 A | 5/2000 | Teicher |
| 5,870,718 A | 2/1999 | Spector | 6,068,183 A | 5/2000 | Freeman et al. |
| 5,870,721 A | 2/1999 | Norris | 6,070,147 A | 5/2000 | Harms et al. |
| 5,875,437 A | 2/1999 | Atkins | 6,070,153 A | 5/2000 | Simpson |
| 5,883,377 A | 3/1999 | Chapin, Jr. | 6,076,068 A | 6/2000 | DeLapa et al. |
| 5,883,810 A | 3/1999 | Franklin | 6,076,072 A | 6/2000 | Libman |
| 5,884,271 A | 3/1999 | Pitroda | 6,078,888 A * | 6/2000 | Johnson, Jr. .................. 705/1 |
| 5,884,278 A | 3/1999 | Powell | 6,078,891 A | 6/2000 | Riordan et al. |
| 5,884,285 A | 3/1999 | Atkins | 6,091,817 A | 7/2000 | Bertina et al. |
| 5,887,065 A | 3/1999 | Audebert | 6,092,056 A | 7/2000 | Tull, Jr. et al. |
| 5,890,138 A | 3/1999 | Godin et al. | 6,095,412 A | 8/2000 | Bertina et al. |
| 5,890,140 A | 3/1999 | Clark et al. | 6,095,416 A | 8/2000 | Grant et al. |
| H1794 H | 4/1999 | Claus | 6,098,053 A | 8/2000 | Slater |
| 5,897,620 A | 4/1999 | Walker et al. | 6,105,011 A | 8/2000 | Morrison, Jr. |
| 5,905,246 A | 5/1999 | Fajkowski | 6,105,865 A | 8/2000 | Hardesty |
| 5,911,135 A | 6/1999 | Atkins | 6,109,525 A | 8/2000 | Blomquist et al. |
| 5,911,136 A | 6/1999 | Atkins | 6,115,458 A | 9/2000 | Taskett |
| 5,920,629 A | 7/1999 | Rosen | 6,119,932 A | 9/2000 | Maloney et al. |
| 5,920,844 A | 7/1999 | Hotta et al. | 6,122,623 A | 9/2000 | Garman |
| 5,920,847 A | 7/1999 | Kolling et al. | 6,128,598 A | 10/2000 | Walker et al. |
| 5,923,734 A | 7/1999 | Taskett | 6,128,599 A * | 10/2000 | Walker et al. ................ 705/14 |
| 5,926,800 A | 7/1999 | Baronowski | 6,129,274 A | 10/2000 | Suzuki |
| 5,930,217 A | 7/1999 | Kayanuma | 6,134,536 A | 10/2000 | Shepherd |
| 5,931,764 A | 8/1999 | Freeman et al. | 6,138,917 A | 10/2000 | Chapin, Jr. |
| 5,933,817 A | 8/1999 | Hucal | 6,145,741 A | 11/2000 | Wisdom et al. |
| 5,937,068 A | 8/1999 | Aubebert | 6,148,297 A | 11/2000 | Swor et al. |
| 5,940,811 A | 8/1999 | Norris | 6,161,096 A | 12/2000 | Bell |
| 5,952,641 A | 9/1999 | Korshun | 6,163,770 A | 12/2000 | Gamble et al. |
| 5,953,423 A | 9/1999 | Rosen | 6,164,533 A | 12/2000 | Barton |
| 5,953,710 A | 9/1999 | Fleming | 6,167,385 A | 12/2000 | Hartley-Urquhart |
| 5,955,961 A | 9/1999 | Wallerstein | 6,169,975 B1 | 1/2001 | White et al. |
| 5,963,648 A | 10/1999 | Kalina | 6,173,267 B1 | 1/2001 | Cairns |
| 5,970,479 A | 10/1999 | Shepherd | 6,182,048 B1 | 1/2001 | Osborn et al. |
| 5,970,480 A | 10/1999 | Giuliani et al. | 6,182,894 B1 | 2/2001 | Hackett et al. |
| 5,974,399 A | 10/1999 | Giuliani et al. | 6,186,793 B1 | 2/2001 | Brubaker |
| RE36,365 E | 11/1999 | Levine et al. | 6,189,787 B1 | 2/2001 | Dorf |
| 5,984,191 A | 11/1999 | Chapin, Jr. | 6,195,644 B1 | 2/2001 | Bowie |
| 5,987,434 A | 11/1999 | Libman | 6,202,053 B1 | 3/2001 | Christiansen et al. |
| 5,988,509 A | 11/1999 | Taskett | RE37,122 E | 4/2001 | Levine et al. |
| 5,991,413 A | 11/1999 | Arditti et al. | 6,227,447 B1 | 5/2001 | Campisano |
| 5,991,748 A | 11/1999 | Taskett | 6,243,688 B1 | 6/2001 | Kalina |
| 5,991,750 A | 11/1999 | Watson | 6,263,316 B1 * | 7/2001 | Khan et al. .................... 705/13 |
| 6,000,608 A | 12/1999 | Dorf | 6,265,977 B1 * | 7/2001 | Vega et al. ............... 340/572.7 |

| | | |
|---|---|---|
| 6,278,981 B1 | 8/2001 | Dembo et al. |
| 6,295,522 B1 | 9/2001 | Boesch |
| 6,298,336 B1 | 10/2001 | Davis et al. |
| 6,308,268 B1 | 10/2001 | Audebert |
| 6,336,099 B1 | 1/2002 | Barnett et al. |
| 6,341,724 B1 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,373,969 B1 | 4/2002 | Adler |
| 6,385,591 B1 | 5/2002 | Mankoff |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 * | 10/2002 | Ricci et al. .............. 370/277 |
| 6,467,684 B1 | 10/2002 | Fite et al. |
| 6,473,500 B1 | 10/2002 | Risafi et al. |
| 6,484,144 B1 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,505,780 B1 | 1/2003 | Yassin et al. |
| 6,529,880 B1 | 3/2003 | McKeen et al. |
| 6,560,578 B1 | 5/2003 | Eldering |
| 6,574,603 B1 | 6/2003 | Dickson et al. |
| 6,581,839 B1 | 6/2003 | Lasch et al. |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B1 | 9/2003 | Richman et al. |
| 6,631,849 B1 | 10/2003 | Blossom |
| 6,641,049 B1 | 11/2003 | Luu |
| 6,641,050 B1 | 11/2003 | Kelley et al. |
| 6,675,127 B1 | 1/2004 | LaBlanc et al. |
| 6,693,544 B1 | 2/2004 | Hebbecker |
| 6,745,938 B1 | 6/2004 | Sullivan |
| 6,802,008 B1 | 10/2004 | Ikefuji et al. |
| 6,805,287 B1 | 10/2004 | Bishop |
| 6,865,547 B1 | 3/2005 | Brake et al. |
| 6,868,426 B1 | 3/2005 | Mankoff |
| 2001/0027441 A1 | 10/2001 | Wankmueller |
| 2001/0034682 A1 | 10/2001 | Knight et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0120627 A1 | 8/2002 | Mankoff |
| 2002/0143703 A1 | 10/2002 | Razvan |
| 2002/0147662 A1 | 10/2002 | Anderson |
| 2002/0165820 A1 | 11/2002 | Anvekar et al. |
| 2002/0174016 A1 | 11/2002 | Cuervo |
| 2003/0004828 A1 | 1/2003 | Epstein |
| 2003/0023549 A1 | 1/2003 | Armes et al. |
| 2003/0028518 A1 | 2/2003 | Mankoff |
| 2003/0046249 A1 | 3/2003 | Wu |
| 2003/0053609 A1 | 3/2003 | Risafi et al. |
| 2003/0101119 A1 | 5/2003 | Persons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0163403 A1 | 8/2003 | Chen et al. |
| 2003/0172040 A1 | 9/2003 | Kemper et al. |
| 2003/0195808 A1 | 10/2003 | Brown et al. |
| 2003/0200180 A1 | 10/2003 | Phelan et al. |
| 2003/0216965 A1 | 11/2003 | Libman |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0098351 A1 | 5/2004 | Duke |
| 2004/0243498 A1 | 12/2004 | Duke |
| 2005/0027649 A1 | 2/2005 | Cech |
| 2005/0071230 A1 | 3/2005 | Mankoff |
| 2005/0075932 A1 | 4/2005 | Mankoff |

FOREIGN PATENT DOCUMENTS

| | | |
|---|---|---|
| EP | 959440 | 11/1999 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 99/05633 | 2/1999 |
| WO | WO 01/69347 A2 | 9/2001 |
| WO | WO 01/69347 A3 | 9/2001 |
| WO | WO 2005/043277 | 5/2005 |

OTHER PUBLICATIONS

"Associates First Capital Corporation", Hoover's Inc., The Industry Standard: The Newsmagazine of the Internet Economy, thestandard.net/companies/cpmpany-display, Apr. 6, 1999, 2 pages.

CardEx Incentives, The Future of Gifts & Incentives, Apr. 6, 1999, 15 pages.

Rosen, "Cash just isn't flexible enough," Express Technology, Friday, Feb. 10, 1995, 1 page.

Britt, "Competing in auto lending," America's Community Banker, vol. 5, No. 11, pp. 33-37, Nov. 1996.

Card News, "D.C. area Safeway stores look for increase in sales volume and revenue with cards," vol. 6, No. 25, ISSN: 0894-0797, Monday, Dec. 30, 1991, 3 pages.

Piskora, "Debit cards seen poised for new markets," American Banker, Credit/Debit/ATM's, Tuesday, Mar. 7, 1995, p. 16.

Jeffrey M. Lacker, "Stored Value Cards: Costly Private Substitutions for Government Currency", Economic Quarterly, 1996, 17 pages.

"The Evolution of a New Consumerism", Chain Store Age, vol. 73, pp. 8-9, Jun. 1997, 3 pages.

Fickenscher, "Amex prepaid offering is latest card for firms regarding employees", American Banker, vol. 161, No. 151, Aug. 8, 1996, 2 pages.

"Welcome to Swiftgift", Swiftgift, www.swiftgiftcard.com, Dec. 8, 1998, 10 pages.

Lzarony, "Stuck for a gift? Give a prepaid credit card", www.bankrate.com, Dec. 21, 1998, 1 page.

Coulton, "Incentives field moving to card-based series 14", American Banker, Mar. 26, 1998, 3 pages.

O'Connor, Business Travel News, "Maritz gets mastercard's stamp of approval", Aug. 19, 1996, 2 pages.

Spurgin, "Sopininmon! or What's happening in the retail credit card environment", Credit World Journal, Apr. 1997, 7 pages.

AT&T Marketing, "Universal card free lifetime membership extended 3 months", www.att.com/press/0297/970217.csa.html, Dec. 4, 1990, 2 pages.

Chain Store Age Executive with Shopping Center Age, "More retailers turn to co-branding", Feb. 1, 1995, 3 pages.

Introducing SpendingMoney(TM), Armetta: Marketing & Design Product Concept Report, Oct. 9, 1996, 15 pages.

First USA Platinum Connect, First USA Bank, First USA Promotional Mailing, Oct. 1997, 6 pages.

Introducing the First USA Platinum Connect Card, First USA Promotional Mailing, Dec. 1997, 2 pages.

Here's the calling convenience you asked for: 1-800-call-AT&T . . . For All Calls, Appendix A: For Card Carriers, 7 pages.

Miriam Krenin Souccar, Smart Cards: 1st Union Smart Card Pilot Enlists a Second Army Base, American Banker, 3 pages, Mar. 31, 1999.

First Union Issues Smart Cards to Fort Benning Recruits, CardFax, 1 page, Mar. 26, 1999, vol. 1999, No. 60.

Emerson Brown and Jim Baum, Purchasing Card Magic: Eli Lilly Finds Accounts Payable Flying High With Plastic, Corporate Cashflow, 4 pages, Nov. 1994.

Christine Dugas, Payroll May Ask: Paper or Plastic?, USA Today, 3B, Aug. 14, 2001, 1 page.

E-Z Pass, Web page, Nov. 12, 2001, http://www.ezpass.com/whatis.html.

E-Z Pass, Web page, Nov. 12, 2001, http://www.ezpass.com/frameMain.htm.

E-Z Pass, Web page, Nov. 12, 2001, http://www.ezpass.com/Disc_portNewYork.htm.

E-Z Pass, Web page, Nov. 12, 2001, http://www.ezpass.com/Disc_ny_annual.htm.

General Counsel's Opinion No. 8—Stored Value Cards, 61 Fed. Reg. 40490, Aug. 2, 1996, <http://wwwfdic.gov/regulations/laws/rules/5500-500.html>.

Song, A card that asks for ID, Time Magazine, Apr. 12, 2004, 1 page.

Hotchkiss, ATM's at the head of their class, Bank Marketing, vol. 29, No. 3, Mar. 1997, pp. 26-32.

Edwards, ATMs The Hot New Media Buy, ABA Banking Journal, Mar. 1999, pp. 58, 60.

Brehl, Banks issue cash-card pledge, The Toronto Star, Oct. 9, 1997, 1 page.

Meece, Boatmen's prepaid cards for worker-incentive firm, American Banker, Jul. 2, 1996, p. 12.

Boatmen's Floats Stored Value into the Employee Incentive Waters, Debit Card News, vol. 2, Issue 2, Jul. 16, 1996, 3 pages.

CardFlash®, Apr. 5, 2005.

CES/NaBANCO introduces stored value card technology, Blockbuster video is first merchant partner, Business Wire, Jan. 15, 1996, 2 pages.

Common electronic purse specifications, Business Requirements; Version 6.0, Dec. 1998.

Consortium created to manage common electronic purse specification, Cardtech Securtech, Chicago, www.visa.com/av/news/PRmisc051199.vhtml, May 11, 1999.

Electronic Purse, SCIA (Smart Card Industry Association), About Smart Cards, printed Feb. 23, 2001, www.scia.org, 1 page.

Sanchez-Klein, Electronic purse alliance planned, Computerworld Online News, Jul. 29, 1998, printed Feb. 23, 2001, 2 pages.

Electronic Purse Can Free You From ATM Drag, Business Times, www.btimes.co.za, printed Feb. 23, 2001, 1 page.

Electronic purse card to be launched tomorrow, New Straits Times, News Clippings, Sep. 18, 1999, printed Feb. 23, 2001, 3 pages.

E-Z Pass, Web page, http://www.ezpass.com/whatis.html, Nov. 12, 2001.

E-Z Pass, Web page, http://www.ezpass.com/frameMain.htm, Nov. 12, 2001.

E-Z Pass, Web page, http://www.ezpass.com/Disc_portNewYork.htm, Nov. 12, 2001.

E-Z Pass, Web page, http://www.ezpass.com/Disc_ny_annual.htm, Nov. 12, 2001.

First Data markets stored-value cards, Cards International, Jan. 30, 1996, p. 5.

Norris, First Data unit develops Blockbuster cash-card, Omaha World Herald, Jan. 19, 1996, Sunrise Edition, p. 16.

ECARD, Frequently asked questions, www.ergeard.com, printed Feb. 23, 2001, 7 pages.

Machlis, Have it the smart way: Burger King program drives smart-card use, Computerworld, printed Feb. 23, 2001, 1 page.

Incentive firms find debit cards a rewarding experience (Off-line debit card issuers converge efforts with companies looking for effective incentives to boost employee productivity and to motivate individuals to buy their products), Debit Card News, vol. 3, No. 11, Nov. 28, 1997, 3 pages.

MailFrontier Survey Finds that Consumers Hold Financial Institutions Accountable for Online Identity Theft, www.mailfrontier.com, Palo Alto, CA, Nov. 2004.

Bogle, Mutual Funds at the Millennium: Fund Directors and Fund Myths, The Vanguard Group, To the '40 Act Institute of PLI (Practicing Law Institute); New York, NY, May 15, 2000, 15 pages.

New 1-800-CALL-ATT campaign promotes one number for all calls, AT&T Marketing, News Release, Feb. 17, 1997, 2 pages.

Proton world and Europay to co-operate in creation of new CEPS-compliant E-purse application, Press releases '99, printed Feb. 23, 2001, Waterloo, Belgium, Jun. 28, 1999, 2 pages.

Purse application for cross border use in euro, CORDIS, Pace 1st 1999-11531 Pace, printed Feb. 23, 2001, www.cordis.lu, 3 pages.

Miller et al. Section E.2.1: Kerberos Authentication and Authorization System, Project Athena, Cambridge, Massachusetts, Dec. 21, 1987, 39 pages.

SK100 Smart Card Electronic Purse Balance Reader, printed Feb. 23, 2001, 1 page.

Smart card for loyalty and e-purse applications eclipses capability of conventional mag-stripe cards, Press Release, www.1.slb.com, Apr. 21, 1997, printed Feb. 23, 2001, 3 pages.

SmartAxis, Load cash on to your e-purse card, Supported Currencies and Schemes, www.smartaxis.co.uk, printed Feb. 23, 2001, 9 pages.

Key, Swift Gift 'Wows' Internet Shoppers, PR Newswire, www.key.com/swiftgift/home.html, Dec. 2, 1998, 1 page.

The Electronic Purse Reaches the Car Park, printed Feb. 23, 2001, 2 pages.

Stuber, The electronic purse: An overview of recent developments and issues, Bank of Canada, Technical Report No.

74, www.bankofcanada.ca, Jan. 1996, printed Feb. 23, 2001, 2 pages.

Stoughton, The Gift of Credit, www.washingtonpost.com/wp-srv/business, Dec. 14, 1998.

ICL, Understanding the benefits, Smartcity offers a number of important benefits to both the card issuers and the customers, www.icl.com, printed Feb. 27, 2001, 2 pages.

Visa Cash, <www.visa-asia.com/pd/cash/main.html>, Feb. 23, 2001.

Visa Cash—Where can I get it?, <www.visa-asia.com/pd/cash/main.html>, Feb. 23, 2001.

Visa first to launch electronic purse load via GSM mobile phone, Johannesburg, Apr. 7, 1999, printed Feb. 23, 2001, www.cellular.co, 4 pages.

Visa International and SERMEPA Announce Plans for Cross Border Visa Cash Based on CEPS, <www.visa.com/av/news/praaamisc111699.vhtml>, Nov. 16, 1999, Paris.

Visa releases Visa cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Welcome to Card Express, The CardEx Incentive Card, as disclosed in the CardEx web site archived by web.archive.org on Feb. 7, 1998; http://web.archive.org/web/*/http://www.cardex.com, retrieve Oct. 18, 2003, 8 pages.

Welcome to Card Express, CardEx web site archived by web.archive.org on Oct. 31, 1996 [http://web.archive.org/web/*/http://www.cardex.com], retrieve Oct. 18, 2003, 7 pages.

Machlis et al., Will smart cards replace ATMs?, Computerworld, printed Feb. 23, 2001, 3 pages.

Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.

AAA Stored Value Cards, The New Way to Pay, [https://www.storedvalue.aaa.com/aaanational/home.cfm?CFID=1615707&CFTOKEN=3f], printed Mar. 13, 2001, 1 page.

AAA Stored Value Cards, Traveling abroad, but don't want to pay like a tourist? [https://www.storedvalue.aaa.com/aaanational/info_global.cfm?CFID=1615707&CTOKEN=3], printed Mar. 13, 2001, 2 pages.

AAA Stored Value Cards, AAA Global Currency Card. [https://www.storedvalue.aaa.com/aaanational/info_faq_global.cfm?CFID=1615707&CTOKEN=3], printed Mar. 13, 2001, 4 pages.

Block, Blockbuster Running Test Of a Stored Value Card, The American Banker, Sep. 1, 1995, 2 pages.

Hove, Electronic Purses: (Which) Way to Go?, First Monday, vol. 5, No. 7, Jul. 2000, [http://firstmonday.org/issues/issue5_hove/index.html], printed Feb. 23, 2001, 32 pages.

Konrad, IBM Had a Bunch of Unusual Ideas in 2003, AP, posted on [philly.com] on Jan. 13, 2004, reprinted on Jan. 21, 2004, 2 pages.

Payment Data Systems files patent on debit card payment solution, Press Release, Mar. 5, 2004.

Banerjee, Smart Card Standards and Electronic Purse, A review paper, May 1997, [http://www.aston.ac.uk/smartcard/documentation/standards1.htm], reprinted on Feb. 23, 2001, 21 pages.

\* cited by examiner

SYSTEM AND METHOD FOR FUNDING A COLLECTIVE ACCOUNT BY USE OF AN ELECTRONIC TAG

RELATED APPLICATIONS

This is a continuation application of U.S. patent application Ser. No. 09/927,462 filed on Aug. 13, 2001 now U.S. Pat. No. 6,945,453. The contents of the above-identified U.S. application are incorporated herein by reference.

FIELD OF THE INVENTION

The invention relates generally to the funding of collective accounts through the use of electronic tags ("tag" or "tags"). More specifically, the invention relates to systems and methods for funding a collective account that may be used for a variety of purposes, such as making charitable contributions or otherwise contributing to causes, based on tag usage and the "float" of a prefunded account associated with a tag.

BACKGROUND OF THE INVENTION

Electronic tags are used today to conduct various financial transactions. For instance, the Mobil® division of Exxon-Mobil Corporation sponsors a program called SPEEDPASS® whereby a customer can purchase gas and other goods and services by activating a system with a tag containing a transponder, where the tag is associated with some source of the customer's funds which are used to pay for the purchase. The tag may be kept on a keyring, and is waved in front of a detector to activate the system.

Another popular, rapidly growing use of electronic tags is in Electronic Toll Collection ("ETC") systems including E-Z PASS,® GEORGIA CRUISE CARD,® SUNPASS,® EPASS,® and FAS-TRAK,® among others, which allow a motorist to electronically charge a toll for using certain roadways without having to physically stop at a tollbooth to pay the toll. ETC systems are a part of the technology known as Intelligent Transportation Systems ("ITS") fostered by the Intelligent Transportation Society of America ("ITSA"), a society composed of private and public members which was mandated by the United States Congress in the Intermodal Surface Transportation Efficiency Act of 1991 ("ISTEA") to coordinate the development and deployment of intelligent transportation systems in the United States. ETC systems enhance the safety, capacity, and efficiency of the tollway systems in this country, as well as improve customer service and satisfaction. In addition, ETC systems improve air quality by reducing the number of vehicles which sit at idle speed at tollbooths.

The users of these tags generally associate a prefunded account to serve as a source of funds to pay for charges made with their tags, where the prefunded account balance is referred to as the "float." These prefunded accounts are maintained by the ETC system operator, who invests the account balances and makes a profit off this "float." The user may automatically replenish the prefunded account by instructing the system to charge additional "float" to an individual checking, savings, or credit card account or other source of funds that is associated with the tag when the prefunded account balance reaches a low limit, or the user may manually replenish the prefunded account balance.

ETC systems operate by detecting some tag identification information associated with the tag using some type of sensor as the motorist passes through a tollbooth or otherwise activates the sensor and determining which prefunded account is associated with that tag. Tag identification information may be contained in bar coded labels, which are placed on the vehicle and detected by laser scanners at the tollbooth. Alternatively, tag identification information may be transmitted via an RF or IR or other type of transponder located in the tag, where the emitted signal is read by a reader/antenna located at the tollbooth. Often the tags are intended to be attached to the motorist's front windshield or side window by some type of adhesive, and are, for the most part, contained in generic plastic casings which many consider unattractive to display.

When the tag identification information is detected by a scanner or reader/antenna at a tollbooth, the prefunded account associated with that tag is debited the amount of the corresponding toll or charge. Annual toll revenues for the nation's toll roads which use ETC systems easily exceed one billion dollars a year,[1] so enrollment of users in the nation's ETC systems contemplates a significant "float" potentially to be held by ETC systems operators.

[1] According to data compiled during the years of 1996 through 1999 by the ETTM, a component of the Intelligent Transportation Systems (ITS). See www.ettm.com/usafac.html.

Some potential ETC users currently do not enroll in the systems because they do not want to leave their money in the prefunded account where they lose the use of the account balance, and where they are committed to spending the prefunded account balance with the ETC system operator. Further, as noted, the tags currently used are considered plain and unattractive, which may lead some motorists not to mount the tags on their windshields, creating a safety hazard as those motorists fumble to find the tag to pay the toll.

SUMMARY OF THE INVENTION

The method and system of the invention overcomes these problems of the prior art, and adds an incentive for potential users to sign up for and to use ETC tag systems. As well, the invention provides ETC systems operators an incentive to make charitable and other contributions based on the users' tag usage and "float."

It is feature of the invention to provide a method and system for funding a collective account with a reward based either on aggregate tag usage of a plurality of tags associated with that collective account or on the aggregate of prefunded account balances for a plurality of prefunded accounts associated with the collective account.

It is another feature of the invention to provide an incentive for potential users of electronic tag systems to open and prefund accounts with electronic tag system operators.

It is yet another feature of the invention to facilitate a method for electronic tag systems operators to make charitable and other financial contributions.

It is yet another feature of the invention to provide an electronic tag that will increase public awareness of charitable or other political or educational causes.

It is yet another feature of the invention to facilitate the earning of rewards in a loyalty program sponsored by or otherwise associated with a for-profit or retail program, where the tag is associated with an individual account that is associated with the loyalty program.

It is another feature of the invention to provide an additional benefit to holders of collective accounts by prefunding accounts with individual accounts that are associated with and benefit the holders of the collective accounts through affinity programs.

It is another feature of the invention to encourage use of ETC systems by motorists and thereby benefiting the environment.

It is yet another feature of the invention to increase safety at toll booths by providing an electronic tag that motorists will want to install on their windshields.

One aspect of the invention relates to a method and system for funding a collective account comprising a plurality of tags and prefunded accounts associated with those tags, associating the tags or the "float" of the prefunded accounts to the collective account, aggregating either the tag usage or the prefunded account balances, calculating a reward based on the aggregate tag usage or prefunded account balances, and funding the reward to the collective account. The funds in the collective account may be used for a variety of purposes, such as making charitable contributions, funding political campaigns, or making contributions to religious or civic groups or educational institutions.

Another aspect of the invention relates to decorating a tag with a symbol, name, or color scheme of the target organization. Not only does such decoration increase public awareness of the tagholder's chosen cause, but it also increases the likelihood that the user (if a motorist) installs the tag on the windshield of the vehicle which increases highway safety by reducing motorist distraction as he or she fumbles to locate the tag as he or she approaches the toll booth.

Another aspect of the invention relates to a method and system for associating a prefunded account for a tag with an individual account that is itself associated with a loyalty program, and increasing credits in the loyalty program through use of the electronic tag. These loyalty program credits may inure to the benefit of the tagholder, as for example where the individual account amasses cash bonuses or frequent flyer miles upon individual account usage. Alternatively, the loyalty program benefits may inure to a charitable or other organization, as where the individual account is an affinity account that makes a contribution to a chosen card based on individual account usage. Further, an organization that is the beneficiary of both an affinity program associated with an individual account associated with a tag and is also the holder of a collective account associated with the same tag may receive double benefits from tag usage.

As used in this specification, the terms "tag" and "tags" refer to any known or later developed device or object, associated in some manner to a source of funds, that may be used to activate a system for automatically making purchases of goods or services and charge the purchase of those goods or services to the associated source of funds. The associated source of funds may itself be a prefunded account, and may also be associated with at least one other source of funds, as an individual account, to replenish the prefunded account balance.

Other features and advantages of the invention will become apparent from the description of the preferred embodiments in conjunction with the following figures.

BRIEF DESCRIPTION OF THE DRAWINGS

The invention will be described with reference to the accompanying drawings, in which like elements are referenced with like numerals.

DETAILED DESCRIPTION OF THE INVENTION

Figure 1:
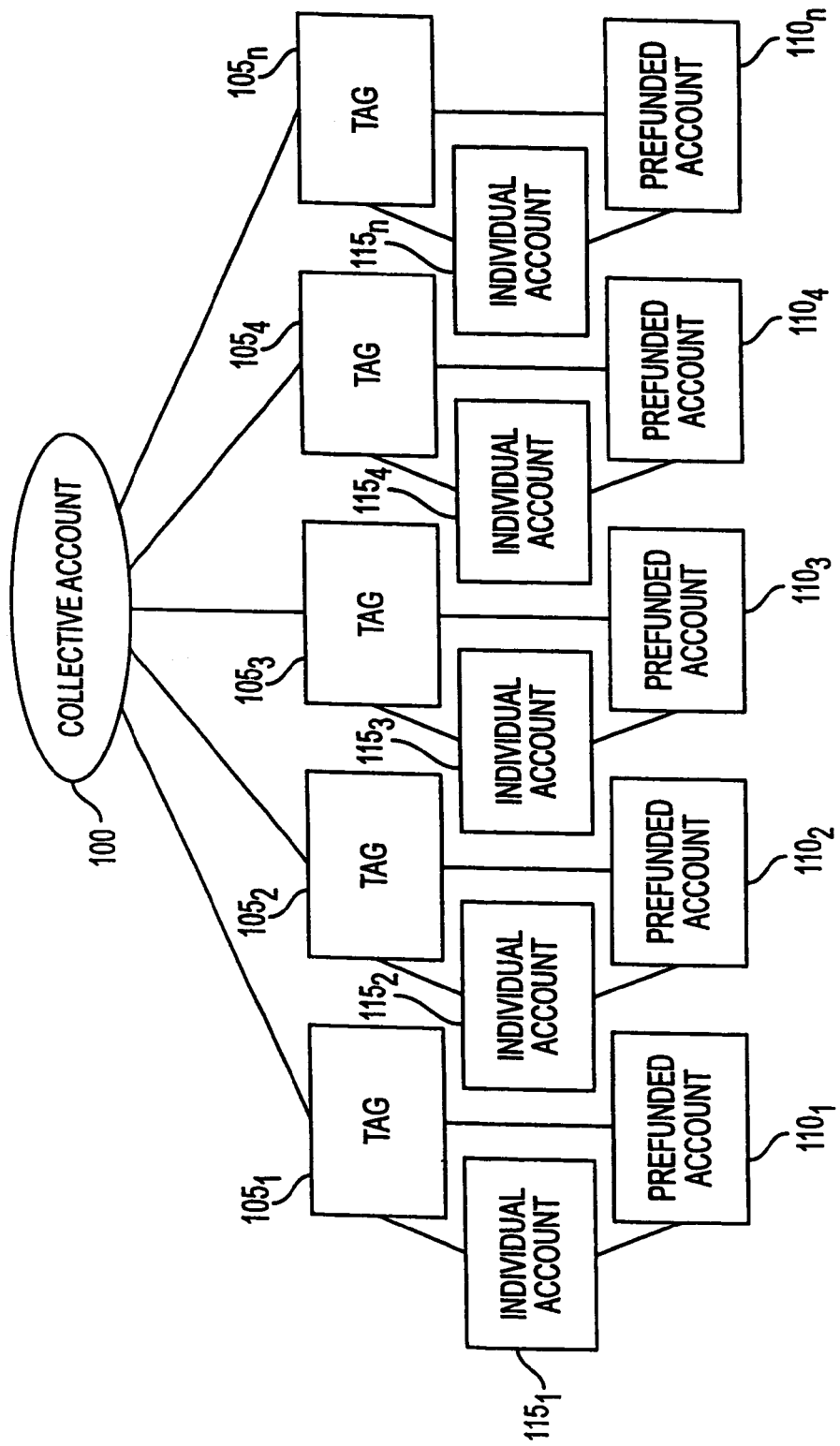
FIG. 1 is a schematic of one embodiment of the invention illustrating a plurality of tags each associated with an individual account, a prefunded account, and a collective account.

The invention relates generally to a method and system for funding a collective account through the use of electronic tags, or through profits made off the "float" of the prefunded accounts associated with those tags. One embodiment of the invention may comprise associating each of a plurality of tags to a prefunded account and a collective account, or alternatively associating the prefunded account directly to the collective account. The invention further comprises aggregating tag usage for all associated tags in the collective account. A reward may be calculated based on the aggregate tag usage for all tags associated with the collective account and the reward credited to the collective account, thus providing an incentive for tagholders to increase their use of ETC systems. The above steps can be accomplished in real time or on a periodic basis. The funds in the collective account may be used for a variety of purposes as, for example, funding of charitable, religious, political, or educational institutions. Individual tagholders may be members of the organization that is the holder of the collective account.

According to another embodiment of the invention, the reward to the collective account may be calculated based on the aggregate prefunded account balances for all prefunded accounts associated with the collective account, thus providing an incentive for tagholders to increase the "float" amounts kept in their prefunded accounts.

In another embodiment of the invention, the system operator may establish a number of collective accounts and designate each collective account for a particular purpose as an environmental purpose, charitable purpose, etc. Tagholders may associate all or a portion of their prefunded accounts and/or tag usage to one or more collective accounts. In this embodiment, it is not necessary that tagholders be members of any organization that is the holder of the collective account, and a single tagholder may associate his or her prefunded account and/or tag usage in percentages to multiple collective accounts.

Tagholders may be issued periodic reporting statements detailing the contributions made in relation to the association of their prefunded accounts and/or tags to collective accounts.

Another embodiment of the invention relates to a computer-based system for funding a collective account, wherein a tag is associated with prefunded and collective accounts. The system may include a host computer capable of programmed response and software capable of monitoring individual tag usage or prefunded account balances, aggregating tag usage or prefunded account balances, and calculating a bonus based on the aggregate tag usage or prefunded account balances of all prefunded accounts associated with a particular collective account. The computer may perform other functions as generating statements of the prefunded accounts to the tagholders and statements of the collective account to the holder of the collective account, and may also be capable of automatically initiating a funds transfer from an individual account associated with the tag and/or prefunded account to replenish the prefunded account based upon predetermined conditions, such as low prefunded account balance. In addition, a plurality of remote computers may be networked or otherwise capable of communicating with the host computer, where the remote computers are associated with reader/antennas at tollbooths or other sites where a tag may be used to purchase a good or service. The reader/antennas may be capable of detecting tag identification information and transmitting the tag identification information along with the charge to the remote computers, which can then transmit the information to the host computer to charge the associated prefunded account for that tag. Alternatively, remote computers may access the host computer for tag identification information, and identify the prefunded account before transmission of the charge information to the host computer.

In another embodiment of the invention, the tag and prefunded account may be associated with an individual account used as a source of funds to replenish the prefunded account based on fulfillment of predetermined conditions, as for example a predetermined low balance amount in the prefunded account. The individual account may be an affinity account, where an organization receives a benefit from use of the individual account. If the affinity organization is also the holder of the collective account, that organization can realize a double benefit from a tagholder's use of the tag—both from the affinity program when the individual account is used to fund the prefunded account, and again when the reward is calculated and awarded based on tag usage. In other embodiments, the individual account may be associated with a loyalty program, where benefits accrue directly to the tagholder upon use of the individual account. In this scenario, increased tag usage benefits the holder of the collective account, and also causes increased needs to replenish the prefunded account, which then benefits the tagholder directly by increased loyalty program credits.

The presence of an LED and/or LCD readout in the tag allows the user to view such information as remaining balance in his or her prefunded account or to receive and/or view messages transmitted from the reader/antenna. The tag may also have the ability to generate a sound that indicates a successful detection by the reader/antenna or a low prefunded account balance which might be a theme song associated with the holder of the collective account, as for example the fight song of a selected university. The tag may have a communication port to allow it to communicate with other devices, as for example relaying traffic information received from the reader/antenna to a device capable of reading and mapping out the relayed information within a vehicle or some remote or hard wired device.

The holder of the collective account can be an organization comprising a plurality of members. However, the tagholders are not necessarily members of the holder of the collective account, as the tagholders may designate different causes to receive the reward. The collective account may also comprise one or more sub-accounts, where each sub-account is designated for a different purpose.

The reward may be calculated in a number of ways. For example, the reward may be based on aggregate tag usage or aggregate "float" of the prefunded account balances associated with the collective account calculated over some period of time. Alternatively, the reward may be customized by basing it on a comparison of aggregate tag usage or aggregate "float" of the prefunded account balances during a given period to historic performance, where increased performance in the given period results in a proportionately greater reward. Alternatively, a minimum performance standard may be set to achieve any reward to be credited to the collective account.

Although the invention is described in terms of electronic tags associated with prefunded accounts, collective accounts, and individual accounts, this description is not intended to limit the invention but is rather one embodiment as will be apparent to those skilled in the art.

Referring now to FIG. 1, a schematic of one embodiment of the invention is detailed for funding a collective account 100 such as a charitable contribution account. The invention comprises a plurality of tags $105_1$ through $105_n$, each tag associated with at least one prefunded account $110_1$ through $110_n$. Also, each tag may be associated with a collective account 100, as selected by the tagholder. Alternatively, each prefunded account $110_n$ may be associated directly with the collective account 100, or each tag $105_n$ may be associated with multiple collective accounts (not shown). The invention further comprises aggregating the tag usage for at least some of the tags associated with the collective account 100, calculating a reward based on the aggregate tag usage, and funding the collective account 100 with the calculated reward. Alternatively, for tags associated with multiple collective accounts, the tagholder may select the percentage of tag usage to be associated with each collective account. In other embodiments, account balances of prefunded accounts $110_1$ through $110_n$ may be aggregated for purposes of calculating the reward. The tags and prefunded accounts may also be associated with individual accounts $115_1$ through $115_n$, which may be used as a source of funds to replenish the prefunded accounts $110_1$ through $110_n$ upon fulfillment of a predetermined condition, as a low prefunded account balance.

Figure 2:
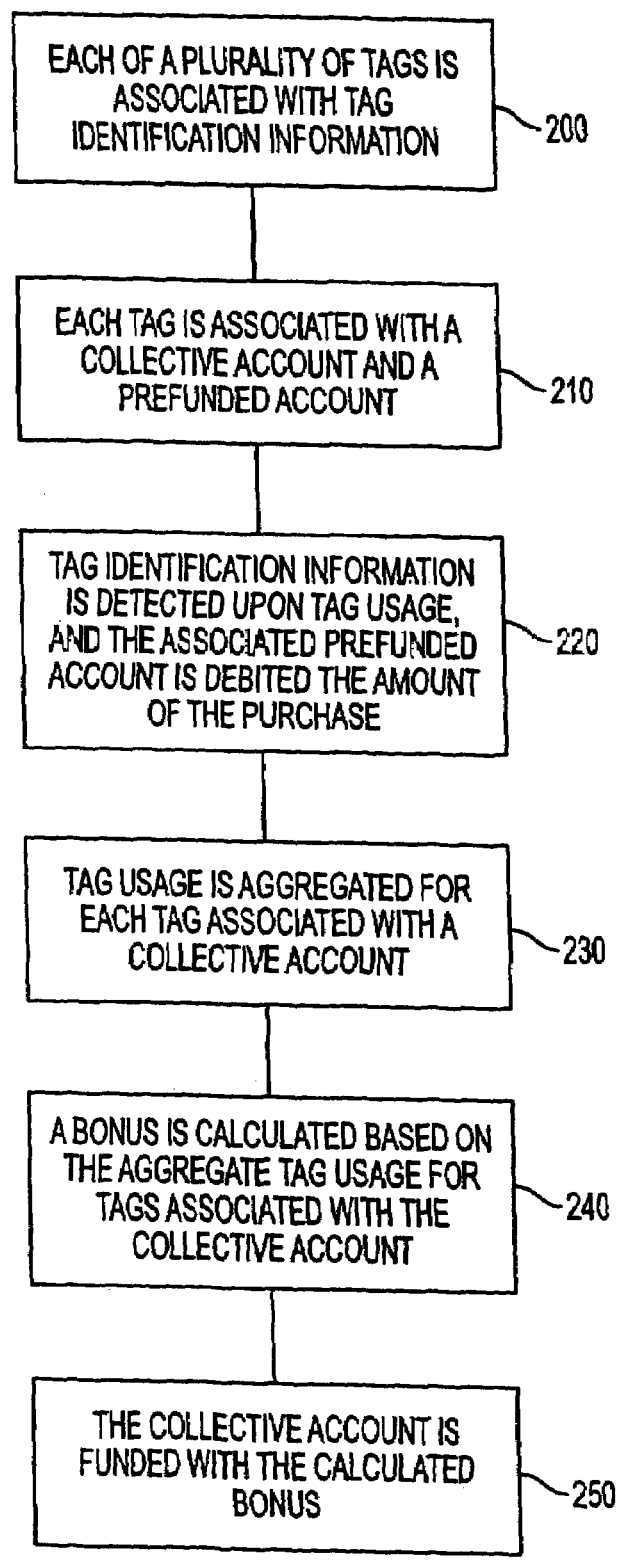
FIG. 2 is a flowscheme of one embodiment of the invention.

A flowscheme of one embodiment of the invention is shown in FIG. 2. At 200, each tag is associated with some tag identification information, which could be detected in various manners as IR or RF transmissions or bar code scanners. At 210, each tag is associated with a prefunded account within the ETC system as well as at least one collective account. When the tag identification information is detected by a reader/antenna during tag usage at 220, it is used by the ETC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection, the ETC system debits the prefunded account associated with the identified tag for the amount of the toll or purchase. Tag usage, or portion of tag usage, can be aggregated for each tag associated with the collective account at 230. At 240, a bonus or reward can be calculated based on aggregate tag usage for a collective account, which is credited to the collective account at 250.

Figure 3:
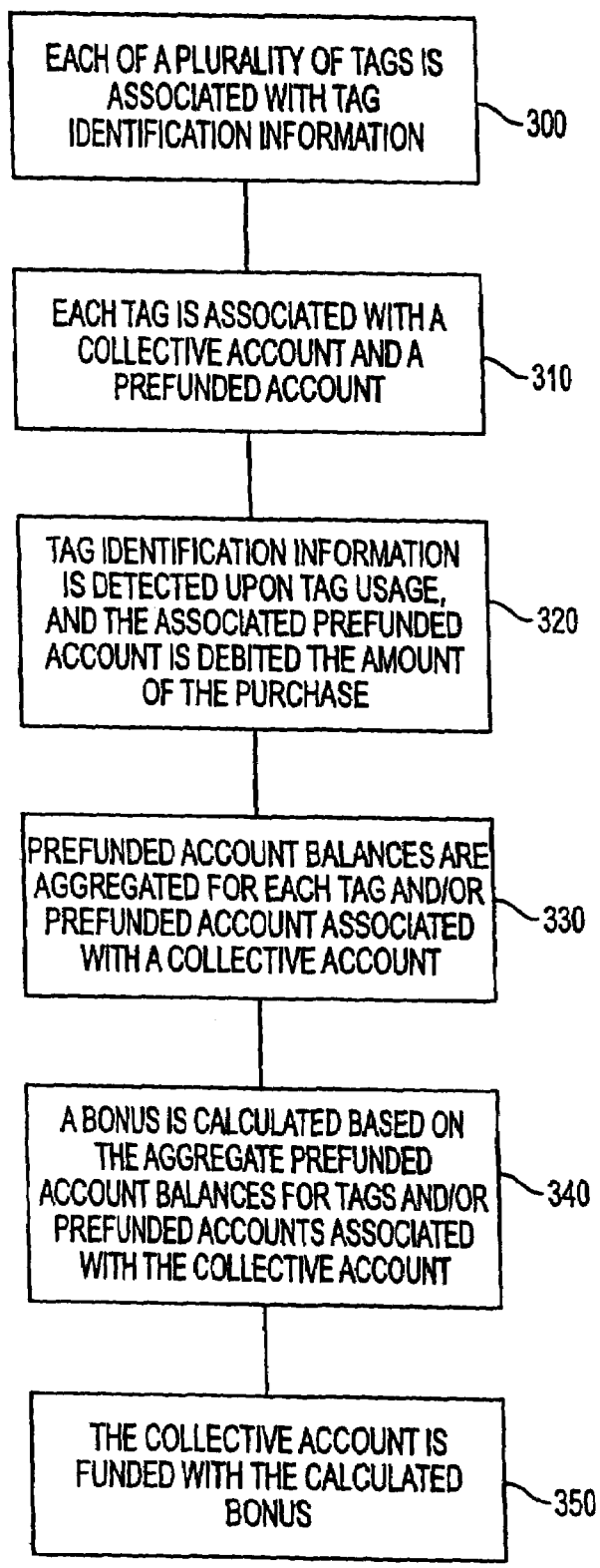
FIG. 3 is a flowscheme of an alternative embodiment of the invention

A flowscheme of an alternative embodiment of the invention is shown in FIG. 3. At 300, each tag is associated with some tag identification information, which could be detected in various manners as IR or RF transmissions or bar code scanners. At 310, each tag is associated with a prefunded account within the ETC system as well as at least one collective account. When the tag identification information is detected by a reader/antenna during tag usage at 320, it is used by the ETC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection, the ETC system debits the prefunded account associated with the identified tag for the amount of the toll or purchase. On some periodic basis, prefunded account balances can be aggregated for each prefunded account associated directly with, or indirectly through a tag with, the collective account at 330. At 340, a bonus or reward can be calculated based on aggregate prefunded account balances for a collective account, which is credited to the collective account at 350.

Figure 4:
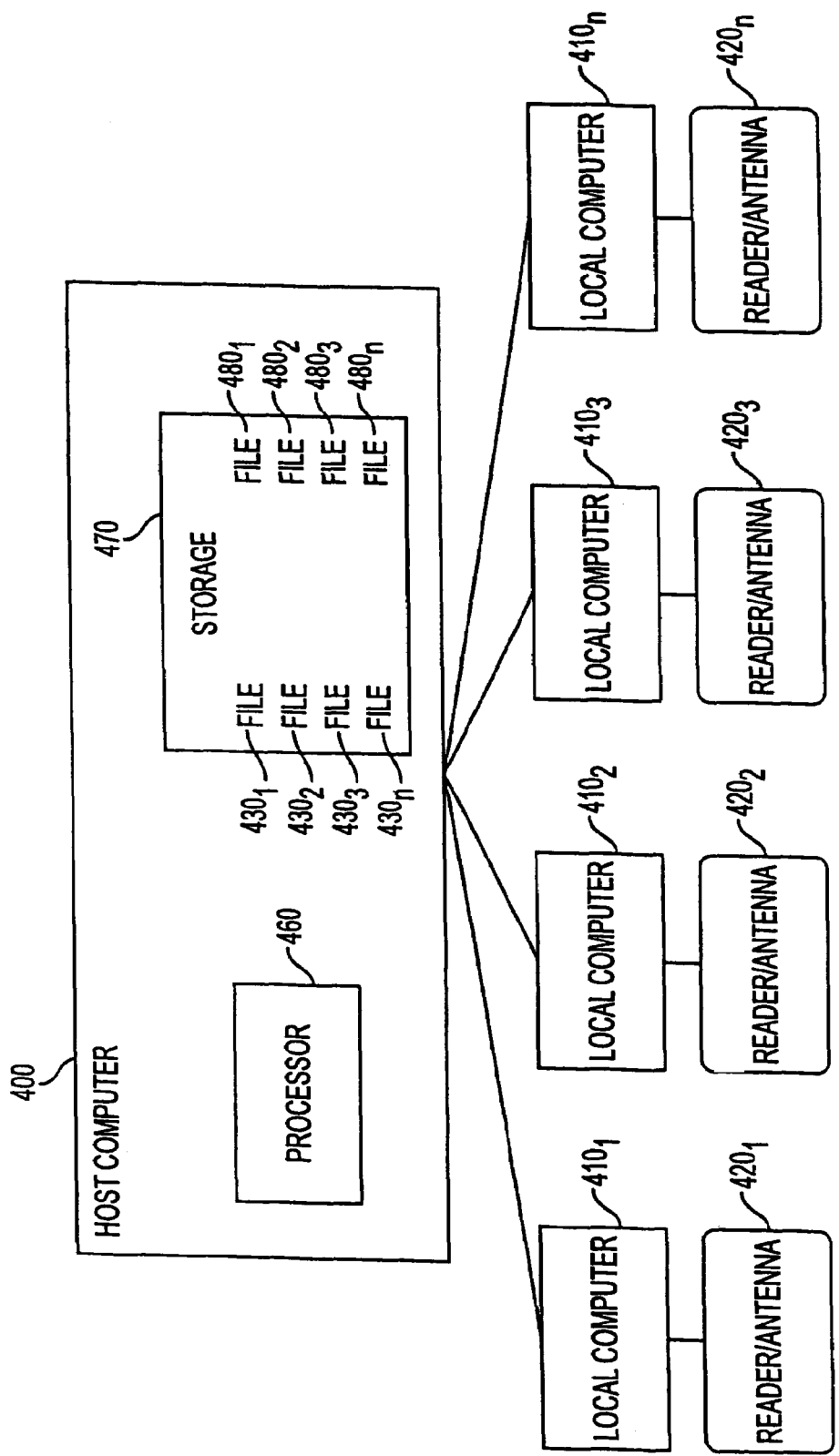
FIG. 4 is a schematic of a computer-based system for funding a collective account.

Referring to FIG. 4, one embodiment of a computer-based system for funding a collective account is described. The ETC system may have a host computer 400, a plurality of remote computers 410$_1$ through 410$_n$, and a plurality of reader/antennas 420$_1$ through 420$_n$ associated with remote computers 410$_1$ through 410$_n$. The host computer has a processor 460 capable of programmed response, and also has a storage unit 470, which may comprise a hard drive or other magnetic, solid state or other storage media, for storing applications, data, operating system and other information.

Upon or anytime after tagholder enrollment with the ETC, searchable indexed computer files 430$_1$ through 430$_n$, are created by the host computer processor 460 for each enrolled tagholder and stored in the host computer storage 470. The files 430$_1$ through 430$_n$ may contain such information as an individual tagholder's name, address, tag identification information, prefunded account information, tag usage, and selected collective account(s). The files 430$_1$ through 430$_n$ may also contain information identifying individual accounts that may be used to replenish the prefunded account balances. Each account can be indexed by the tag identification information, name, and selected collective account. Also, files 480$_1$ through 480$_n$ may be created by processor 460 and stored in storage 470 containing information for a plurality of collective accounts.

A plurality of readers/antenna 420$_1$ through 420$_n$ may be located at remote locations from the host computer 400 at the sights where the tagholders use the tags to purchase goods or services. The tag can transmit or is otherwise detectable to provide the tag identification information. Each reader/antenna 420$_n$ may be associated with and capable of communicating with a remote computer 410$_n$, where each remote computer is capable of communicating with and transmitting information to and receiving information from the host computer 400. In addition, each local computer 410$_n$ may also have a processor capable of programmable response and storage capability.

When a tag is detected by the reader/antenna 420$_n$ for a purchase of a good or a service, tag identification information can be recorded in the local computer 410$_n$ along with the amount of the charge. Either in real time or on a periodic basis, the local computer 410$_n$ can communicate with the host computer 400 and transmit the detected tag identification information along with the associated charge amount. Using the tag identification information, the host computer 400 can access the file 430$_n$ indexed by that tag identification information, and debit the prefunded account associated with that file for the charge amount.

Either in real time or on a periodic basis, the processor 460 of the host computer 400 can access all tags and/or prefunded accounts that are associated with a certain collective account 480$_n$ and either aggregate the total tag usage or the "float" of the prefunded account balances for the prefunded accounts associated with that collective account. A reward can be calculated based on these aggregates, and the processor 460 can initiate a funds transfer in an amount equal to the reward to the collective account 480$_n$.

The foregoing embodiments have been presented for the purpose of illustration and description only and are not to be construed as limiting the scope of the invention in any way. The scope of the invention is to be determined from the claims appended hereto.

What is claimed is:

1. A method for distributing a reward, comprising:
associating an RFID tag with an individual account, a financial institution and at least one organization, wherein the tagholder is the holder of the individual account, wherein further the financial institution comprises one or more host computers, wherein further the host computer aggregates RFID tag usage and calculates a first reward based on aggregate RFID tag usage, wherein RFID tag usage comprises aggregating purchase amounts for purchases of at least one of goods or services from a plurality of merchants when the RFID tag is presented to the merchant at time of purchase;
attributing the first reward to the individual account;
attributing a second reward to a collective account associated with the at least one organization, wherein the organization comprises a business organization, a trade organization, a political party, a religious organization, an athletic organization, a professional society, an educational organization, a charitable organization, a fund-raising organization, or a governmental organization, or combinations thereof; and
distributing the first reward to the tagholder.

2. The method of claim 1, wherein the business organization comprises a retail organization, a wholesale sales club, an airline or a political organization.

3. The method of claim 2, wherein the political organization has income that is exempt from taxation in part or in whole by one or more of a federal, state or local governmental body.

4. The method of claim 1, wherein the trade organization comprises a labor union.

5. The method of claim 1, wherein the religious organization comprises a church or a Jewish congregation.

6. The method of claim 1, wherein the athletic association comprises a professional sports association, a professional sports team, a collegiate sports association, a collegiate sports team, an amateur sports association, an amateur sports team, an international sports competition or a sports association or team associated with one or both of the United States Olympic Committee® or the International Olympic Committee®.

7. The method of claim 6, wherein the athletic association further comprises a team or league for the sport of one of baseball, soccer, hockey, football, basketball, golf, volleyball, swimming, diving, bowling, wrestling, boxing, martial arts, softball, gymnastics, ice skating, car racing, truck racing, motorcycle racing, snow skiing, snow boarding, water skiing, wakeboarding, horse racing, rowing, bicycling, archery, runmng, weight lifting, jai alai, lacrosse, rugby, cricket or billiards.

8. The method of claim 1, wherein the professional society comprises a professional licensing entity.

9. The method of claim 1, wherein the educational organization comprises a university, a community college, a junior college, a high school, a middle school, an adult education organization, a college, an institute, an academy or an alumni association.

10. The method of claim 1, wherein the charitable organization comprises a not-for-profit charitable organization whose income is exempt from taxation in part or in whole by one or more of a federal, state or local governmental body.

11. The method of claim 1, wherein the governmental organization comprises an agency or department of a state, a commonwealth, a precinct, a township, a county, a city, a parish, a borough or a federal government.

12. The method of claim 1, wherein the financial institution comprises a national banking association, a savings and loan association, a savings society, a credit union, a building society, a savings club, a mutual fund, a brokerage house or an equities fund.

13. The method of claim 1, wherein the goods comprise vehicles, clothing, concert tickets, airline tickets, sports event tickets, play tickets, groceries, sundries, pharmaceutical products, machinery, tools, building products, hardware, fuel or any combination thereof.

14. The method of claim 1, wherein the services comprise spa services, vehicle repair services, home repair services, construction services, restaurant services, home maintenance services, vehicle maintenance services, grooming services, medical services, pet care services, transportation services or any combination thereof.

15. The method of claim 1, further comprising:
associating the RFID tag with at least one prefunded account, wherein the prefunded account has a balance;
maintaining at least one of the prefunded accounts; and
debiting the balance of at least one of the prefunded accounts in an amount related to RFID tag usage.

16. The method of claim 15, further comprising replenishing the prefunded account balance with funds from the individual account associated with the RFID tag upon fulfillment of some predetermined condition.

17. The method of claim 15, wherein the individual account is associated with at least one loyalty program, wherein further the tagholder earns a third reward based on the tagholder's participation in the loyalty program.

18. The method of claim 1, wherein the second reward is calculated based on aggregate RFID tag usage.

19. The method of claim 1, wherein the RFID tag is branded with a symbol, name, colors or combinations thereof generally associated with the at least one organization.

20. The method of claim 19, wherein the symbol comprises a logo, a trademark, a service mark, a trade name, a mascot, an emblem, an insignia, a monogram, initials or combinations thereof.

21. The method of claim 19, wherein the symbol, name, colors or combinations thereof are displayed upon satisfaction of a predetermined condition.

22. The method of claim 21, wherein the predetermined condition comprises a purchase amount, a purchase location, frequency of purchases or cumulative amount of purchases.

23. The method of claim 19, wherein the symbol, name, colors or combinations thereof comprise a media event.

24. The method of claim 23, wherein the media event comprises a visual media event, an audio media event, a physical media event or combinations thereof.

25. The method of claim 24, wherein the physical media event comprises vibration.

26. The method of claim 24, wherein the visual media event is selected in advance by the RFID tagholder.

27. The method of claim 1, wherein the RFID tag comprises a sound generating device.

28. The method of claim 27, wherein the sound generating device generates a programmed sound generally associated with the organization.

29. The method of claim 28, wherein the programmed sound comprises a fight song, a tagline or a signature song.

30. The method of claim 1, wherein one or both of the first and second rewards comprise cash, airline miles, reward points, services, goods, rebates, up front payments, statement credit, discounts, interest or combinations thereof.

31. The method of claim 1, wherein the tagholder selects the organization.

32. The method of claim 1, wherein the tagholder earns a fourth reward from the issuer of the individual account based on individual account usage.

33. The method of claim 1, wherein the RFID tag comprises an LED controllable via the tagholder.

34. The method of claim 33, wherein the LED comprises a display responsive to temperature.

35. The method of claim 33, wherein the LED comprises a media event.

36. The method of claim 35, wherein the media event comprises a visual media event, an audio media event, a physical media event or combinations thereof.

37. The method of claim 36, wherein the physical media event comprises vibration.

38. The method of claim 36, wherein the visual media event is selected in advance by the RFID tagholder.

39. The method of claim 33, wherein the LED display comprises a barcode.

40. The method of claim 1, wherein the RFID tag comprises an LCD controllable via the tagholder.

41. The method of claim 40, wherein the LCD comprises a display responsive to temperature.

42. The method of claim 40, wherein the LCD comprises a media event.

43. The method of claim 42, wherein the media event comprises a visual media event, an audio media event, a physical media event or combinations thereof.

44. The method of claim 43, wherein the physical media event comprises vibration.

45. The method of claim 43, wherein the visual media event is selected in advance by the RFID tagholder.

46. The method of claim 40, wherein the LCD display comprises a barcode.

47. The method of claim 1, wherein the RFID tag comprises at least one communication port allowing the tag to communicate with other devices.

48. The method of claim 1, wherein the RFID tag comprises a microprocessor.

49. The method of claim 1, wherein the RFID tag comprises a transmitter.

50. The method of claim 1, wherein the RFID tag further comprises at least one of a smart card, a plastic card, a bar coded sticker, a transponder readable by a reader/antenna, or combinations thereof.

51. The method of claim 50, wherein the RFID tag operates in half duplex mode.

52. The method of claim 51, wherein the RFID tag operates in full duplex mode.

53. The method of claim 1, wherein the individual account comprises a credit account, a debit account, a stored value account, a home equity line of credit account, a mutual fund account, a money market account, a savings account, a checking account, a nonchecking deposit account, a telephone card account, a rewards account, a special premises account for use by employees of an entity or a margin account.

54. The method of claim 1, wherein the first reward is distributed substantially contemporaneously at the time of purchase.

55. The method of claim 1, wherein the first reward is distributed upon demand by the tagholder to the financial institution.

56. The method of claim 55, wherein the tagholder makes the demand substantially upon association of the RFID tag with the individual account.

57. The method of claim 56, wherein the demand comprises automatic distribution of the first reward to the individual account substantially upon RFID tag usage.

58. The method of claim 56, wherein the demand comprises automatic periodical distribution of the first reward to the individual account.

59. The method of claim 1, wherein the RFID tag is embedded in a key, a fob, a token, a pager, a watch, a PDA, a cellular phone, clothing or a plastic card.

60. The method of claim 59, wherein the token or fob is attached to a keychain.

61. The method of claim 1, wherein the merchant comprises a retailer, a grocer, a restaurateur, a service provider or any combination thereof.

62. The method of claim 1, wherein the RFID tag is physically presented to the merchant at a point of sale device.

63. The method of claim 1, wherein the RFID tag is presented to the merchant over a network.

64. The method of claim 63, wherein the network comprises a LAN, a WAN or Ethernet.

65. The method of claim 1, wherein the RFID tag is presented to the merchant over a telephone connection.

66. An automated, computer-based method for distributing rewards to an individual account and a collective account comprising:

maintaining a prefunded first account that is associated with an RFID tag, wherein the prefunded first account has an account balance, wherein further the RFID tag is associated with the tagholder, a financial institution and at least one organization, wherein further the financial institution comprises one or more host computers, wherein further the host computer aggregates RFID tag usage and calculates a first reward based on aggregate RFID tag usage, wherein RFID tag usage comprises funding purchases for at least one of goods or services from a plurality of merchants with the prefunded account when the RFID tag is presented to the merchant at time of payment for the purchases;

associating the prefunded first account with a second account;

attributing the first reward to the second account;

attributing a second reward to a collective account associated with the at least one organization, wherein the organization comprises a business organization, a trade organization, a political party, a religious organization, an athletic organization, a professional society, an educational organization, a charitable organization, a fund-raising organization, or a governmental organization, or combinations thereof; and distributing the first reward to the tagholder.

67. The method of claim 66, wherein the second reward is calculated based on aggregate RFID tag usage.

68. The method of claim 66, wherein the RFID tag is branded with a symbol, name and/or colors generally associated with the at least one organization.

69. The method of claim 66, wherein the RFID tag comprises a sound generating device.

70. The method of claim 69, wherein the sound generating device generates a programmed sound generally associated with the organization.

71. The method of claim 66, wherein one or both of the first and second rewards comprise cash, airline miles, reward points, services, goods, rebates, up front payments, statement credit, discounts or combinations thereof.

72. The method of claim 66, wherein the tagholder selects the organization.

73. The method of claim 66, wherein the tagholder earns a third reward from the issuer of the second account based on second account usage.

74. The method of claim 66, wherein the RFID tag comprises an LED controllable via the tagholder.

75. The method of claim 66, wherein the RFID tag comprises an LCD controllable via the tagholder.

76. The method of claim 66, wherein the tag comprises at least one communication port allowing the RFID tag to communicate with other devices.

77. The method of claim 66, wherein the RFID tag comprises a microprocessor.

78. The method of claim 66, wherein the RFID tag comprises a transmitter.

79. The method of claim 66, wherein the RFID tag further comprises at least one of a smart card, a plastic card, a bar coded sticker, a transponder readable by a reader/antenna, or combinations thereof.

80. The method of claim 79, wherein the RFID tag operates in half duplex mode.

81. The method of claim 79, wherein the RFID tag operates in full duplex mode.

* * * * *